United States Patent
Itadani et al.

(10) Patent No.: US 9,587,745 B2
(45) Date of Patent: Mar. 7, 2017

(54) SLIDING COMPONENT

(71) Applicant: EAGLE INDUSTRY CO., LTD., Tokyo (JP)

(72) Inventors: Masatoshi Itadani, Tokyo (JP); Yuichiro Tokunaga, Tokyo (JP); Kazumasa Sunagawa, Tokyo (JP); Hikaru Katori, Tokyo (JP)

(73) Assignee: EAGLE INDUSTRY CO., LTD. (JP)

(*) Notice: Subject to any disclaimer, the term of this patent is extended or adjusted under 35 U.S.C. 154(b) by 0 days.

(21) Appl. No.: 14/758,765

(22) PCT Filed: Dec. 19, 2013

(86) PCT No.: PCT/JP2013/084029
§ 371 (c)(1),
(2) Date: Jun. 30, 2015

(87) PCT Pub. No.: WO2014/174725
PCT Pub. Date: Oct. 30, 2014

(65) Prior Publication Data
US 2016/0033045 A1 Feb. 4, 2016

(30) Foreign Application Priority Data
Apr. 24, 2013 (JP) .................................. 2013-091026

(51) Int. Cl.
F16J 15/40 (2006.01)
F16J 15/34 (2006.01)

(52) U.S. Cl.
CPC ......... F16J 15/3412 (2013.01); F16J 15/348 (2013.01)

(58) Field of Classification Search
CPC ...... F16J 15/34; F16J 15/3404; F16J 15/3408; F16J 15/3412; F16J 15/3416; F16J 15/3424
See application file for complete search history.

(56) References Cited

U.S. PATENT DOCUMENTS 4,406,466 A * 9/1983 Geary, Jr. ............ F16J 15/3412
277/347
5,556,111 A 9/1996 Sedy ........................... 277/96.1
(Continued)

FOREIGN PATENT DOCUMENTS

DE 3619489 12/1987 ............... F16J 15/34
JP S5958252 4/1984 ............... F16J 15/34
(Continued)

OTHER PUBLICATIONS

International Search Report issued in application No. PCT/JP2013/084029, dated Mar. 25, 2014 (4 pgs).
(Continued)

Primary Examiner — Gilbert Lee
(74) Attorney, Agent, or Firm — Hayes Soloway P.C.

(57) ABSTRACT

Even when a fluid discharge for discharging high-pressure fluid (sealed fluid) to a high-pressure side of a sealing face is provided, the disclosed sliding component prevents precipitation, adhesion and accumulation of a deposition-causing substance through a dehydration condensation reaction between the high-pressure fluid and low-pressure fluid on the sealing face, and also prevents occurrence of cavitation which would otherwise take place in association with a sudden pressure drop due to a discharge of fluid. Disclosed is a pair of sliding components provided, on a high-pressure side of one of relatively sliding sealing faces thereof, with a fluid discharge for discharging fluid to a high-pressure fluid side, wherein a buffer groove for reducing penetration of low-pressure fluid toward the high-pressure fluid side is provided in the sealing face S on a low-pressure side of the fluid discharge.

4 Claims, 10 Drawing Sheets

(56) References Cited

U.S. PATENT DOCUMENTS

| | | | |
|---|---|---|---|
| 6,446,976 B1 * | 9/2002 | Key | F16J 15/3416 |
| | | | 277/367 |
| 2010/0066027 A1 * | 3/2010 | Vasagar | F01D 11/003 |
| | | | 277/350 |
| 2013/0209011 A1 | 8/2013 | Tokunaga | F16C 32/0633 |

FOREIGN PATENT DOCUMENTS

| | | | | |
|---|---|---|---|---|
| JP | S60107461 | 7/1985 | | B63H 23/36 |
| JP | S6182177 | 5/1986 | | F16J 15/34 |
| JP | H01133572 | 9/1989 | | F16J 15/34 |
| JP | 2006022834 | 1/2006 | | F16J 15/34 |
| WO | WO2012046749 | 4/2012 | | F16J 15/34 |

OTHER PUBLICATIONS

International Preliminary Report on Patentability issued in application No. PCT/JP2013/084029, dated Nov. 5, 2015 (8 pgs).
Chinese Office Action issued in application No. 201380070532.6, dated Jan. 28, 2016 (13 pgs).
Chinese Office Action issued in application No. 201380070532.6 (with translation), dated Sep. 20, 2016 (12 pgs).

* cited by examiner (a)

(b) (c) (d)

SLIDING COMPONENT

TECHNICAL FIELD

The present invention relates to a sliding component suitable, for example, for a mechanical seal, a bearing unit or other sliding part. Particularly, the present invention relates to a sliding component such as a seal ring or bearing that requires both reduction in friction by interposing fluid between sealing faces and prevention of leakage of the fluid from the sealing faces.

BACKGROUND ART

In a mechanical seal that is one example of such a sliding component, the performance thereof is evaluated based on leakage rate, wear rate and torque. In conventional technologies, a reduction in leakage, an extension in life and a reduction in torque are attained by optimizing the sliding material and sealing face roughness of a mechanical seal to enhance the performance. However, due to a recent rise in the awareness of environmental problems, further improvements in the performance of mechanical seals are demanded, and technical developments beyond the bounds of the conventional technologies are increasingly needed accordingly. The conventional technologies for mechanical seal include one that achieves improved seal function at a sealing face by providing, as shown in FIG. 10, a sliding component 50 with spiral grooves 52 in a sealing face 51 thereof and forcing sealed fluid, which would otherwise leak to a low-pressure fluid side, back toward a high-pressure fluid side through the use of pumping action of the spiral grooves 52 (for example, refer to Patent Citation 1).

CITATION LIST

Patent Literature

Patent Citation 1: JP-A-61-82177(U) (FIGS. 1 and 2)

SUMMARY OF INVENTION

Technical Problem

According to the above-mentioned conventional technology, the sealing face 51 is provided on a high-pressure side with the spiral grooves 52 angled to discharge fluid to the high-pressure fluid side by relative sliding with a counter sealing face, whereby the fluid is forced back to the high-pressure fluid side under the viscous pump effect of the spiral grooves 52 to prevent the leakage.

However, the present inventors' studies revealed that in this type of mechanical seals, low-pressure fluid 53, for example, air penetrates to the low-pressure fluid side of the sealing face under the a fluid pumping effect by sliding, and promotes a dehydration condensation reaction of high-pressure fluid, that is, sealed fluid existing as lubricating fluid on the sealing face, and that the resulting precipitation, adhesion and accumulation of a deposition-causing substance on the sealing face lead to a deterioration in the sealing performance of the sealing face.

The above-mentioned conventional technology also involves a problem in that the lubrication of the sealing face is insufficient.

A first object of the present invention is to provide a sliding component, which has is improved seal function at a sealing face thereof by preventing, even when the sliding component is provided with a fluid discharge means for discharging high-pressure fluid (sealed fluid) to a high-pressure side of the sealing face, a deterioration in the sealing performance of the sealing face based on prevention of precipitation, adhesion and accumulation of deposition-causing substance through a the dehydration condensation reaction on the sealing face between the high-pressure fluid and the low-pressure fluid and also the prevention of the occurrence of cavitation associated with a sudden pressure drop due to a discharge of fluid.

A second object of the present invention is to provide a sliding component configured to have a sealing face provided with improved lubricity without reducing the negative pressure generating capacity of a fluid discharge means.

Solution to Problem

{Principle}

The present invention is firstly to provide, in sliding components including a fluid discharge means provided on a high-pressure side of a sealing face of at least one of the sliding components for discharging fluid to a high-pressure fluid side, a buffer groove in the sliding face on a low-pressure side of the fluid discharge means for reducing penetration of low-pressure fluid toward the high-pressure fluid side. The buffer groove, which is provided in the sealing face on the low-pressure side of the fluid discharge means, functions as a buffer for the low-pressure fluid, which penetrates from the low-pressure fluid side onto the sealing face, against the high-pressure fluid, whereby the time until the sealing face is filled with the low-pressure fluid can be delayed to suppress the dehydration condensation reaction of the high-pressure fluid.

When the low-pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

The occurrence of cavitation associated with a sudden pressure drop due to a discharge of fluid can be also prevented.

The present invention is secondly to provide, in sliding components including a fluid discharge means for discharging fluid to a high-pressure fluid side on a sealing face of one of the, a positive pressure generating mechanism on a high-pressure side of the sealing face and also a fluid discharge means for discharging fluid to the high-pressure side on a low-pressure side of the positive pressure generating mechanism, and also a pressure releasing groove between the positive pressure generating mechanism and the fluid discharge means.

The positive pressure generating mechanism improves the lubricity by broadening the space between the relatively sliding sealing faces through the generation of a positive pressure (dynamic pressure) and forming a liquid film between the sealing faces. The pressure releasing groove, on the other hand, maintains the seal function between the sealing faces by releasing a positive pressure (dynamic pressure), which has been generated by the positive pressure generating mechanism on the high-pressure side, to the pressure of the fluid on the high-pressure side to prevent the fluid from flowing into the fluid discharge means and the negative pressure generating capability of the fluid discharge means from being lessened.

{Means}

To attain the above-mentioned objects, a pair of sliding components according to the present invention firstly features that in the pair of sliding components provided, on a high-pressure side of one of relatively sliding sealing faces thereof, with, wherein a buffer groove for reducing penetration of low-pressure fluid toward the high-pressure fluid side is provided in the fluid discharge means.

According to this feature, the buffer groove provided in the sealing face on the low-pressure side of the fluid discharge means functions as a buffer for the low-pressure fluid, which penetrates from the low-pressure fluid side onto the sealing face, against the high-pressure fluid, whereby the time until the sealing face is filled with the low-pressure fluid can be delayed to suppress the dehydration condensation reaction of the high-pressure fluid.

When the low-pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

Even if a sudden pressure drop occurs due to a discharge of fluid by the fluid discharge means, the occurrence of cavitation can be prevented since the sudden pressure drop is reduced by the fluid existing in the buffer groove.

The sliding components of the present invention secondly features that in the first feature, the buffer groove is preferably formed in a semicircular, rectangular or dovetail shape in cross-section.

The sliding components of the present invention thirdly features that in the first or second feature, buffer groove has a width b set preferably at 10 to 500 μm, more preferably at 50 to 200 μm.

The sliding components of the present invention fourthly features that in the third feature, the buffer groove has a depth h set at 1 to 2 times the width b.

According to these features, the capacity of the buffer groove can be increased while securing the sealing face.

The sliding components of the present invention fifthly features that in any one of the first to fourth features, the fluid discharge means comprises a spiral groove.

According to this feature, despite the adoption, as the fluid discharge means, of the spiral groove associated with a potential sudden pressure drop due to its high fluid discharge function (high sealing effect), the precipitation, adhesion and accumulation of a deposition-causing substance through the dehydration condensation reaction of high-pressure fluid can be prevented and the occurrence of cavitation can be also prevented.

The sliding components of the present invention sixthly features that in any one of the first to fourth features, the fluid discharge means comprises a reverse Rayleigh step.

According to this feature, despite the adoption, as the fluid discharge means, of the reverse Rayleigh step associated with a potential sudden pressure drop due to its high fluid discharge function (high sealing effect), the precipitation, adhesion and accumulation of a deposition-causing substance through the dehydration condensation reaction of high-pressure fluid can be prevented and the occurrence of cavitation can be also prevented.

The sliding components of the present invention seventhly features that in the fifth or sixth feature, the sealing face is provided, on the high-pressure side thereof, with a fluid circulation groove in communication with the high-pressure fluid side in addition to the spiral groove or reverse Rayleigh step, and is also provided with a positive pressure generating mechanism in a part flanked by the fluid circulation groove and the high-pressure fluid side; and the positive pressure generating mechanism is in communication with an inlet portion of the fluid circulation groove and is isolated from an outlet portion of the fluid circulation groove and the high-pressure side by a land portion.

According to this feature, despite the provision of the fluid circulation groove, which plays a role of actively introducing and discharging sealed fluid from the high-pressure fluid side onto and from the sealing face for preventing fluid and corrosion products and the like contained therein from concentrating on the sealing face, in addition to the spiral groove or reverse Rayleigh step associated with a potential sudden pressure reduction, the precipitation, adhesion and accumulation of a deposition-causing substance through the dehydration condensation reaction of high-pressure fluid can be prevented and the occurrence of cavitation can be also prevented.

A pair of sliding components according to the present invention eighthly features that in the pair of sliding components provided, on a high-pressure side of one of relatively sliding sealing faces thereof, with a fluid discharge means for discharging fluid to a high-pressure fluid side, wherein a positive pressure generating mechanism for generating a positive pressure is provided in the sealing face on a high-pressure side of the fluid discharge means such that the positive pressure generating mechanism is isolated from the high-pressure fluid side by a land portion; an annular pressure releasing groove provided between the fluid discharge means and the positive pressure generating mechanism, the pressure releasing groove is connected to a discharge-side end of the fluid discharge means, and is separated from the positive pressure generating mechanism in a radial direction by a land part; and a radial groove provided to communicate the pressure releasing groove and the high-pressure fluid side with each other, and the radial groove is provided at a position where the radial groove is in contact with an upstream end of the positive pressure generating mechanism.

According to this feature, the lubricity can be improved by broadening the space between the relatively sliding sealing faces by the positive pressure generating mechanism and forming a liquid film between the sealing faces, and the sealing performance between the sealing faces can be also improved by releasing a positive pressure (dynamic pressure), which has been generated by the positive pressure generating mechanism on the high-pressure side, to the pressure of the fluid on the high-pressure side through the pressure releasing groove to prevent the fluid from flowing into the fluid discharge means and the negative pressure generating capability of the fluid discharge means from being lessened.

The sliding components of the present invention ninthly features that in the eighth feature, an even number of radial grooves are disposed in a circumferential direction, each adjacent ones of the radial grooves are different from each other in the direction of inclination, or an inlet of each radial groove in one group is inclined toward an upstream side, and an outlet of each radial groove in the other group is inclined toward a downstream side.

According to this feature, a gentle flow of fluid is produced in a deep groove constituted by the pressure releasing groove and the radial groove. Therefore, bubbles, impurities and the like are prevented from staying in the deep groove, fluid which is about to flow in toward the low-pressure side can be surely released to the high-pressure fluid side under a pressure generated by the positive pressure generating mechanism on the high-pressure fluid side, and the sealing performance can be thus improved.

The sliding component of the present invention tenthly features that in the eighth or ninth feature, the sealing face is provided, on the low-pressure side of the fluid discharge means, with a buffer groove that reduces the penetration of low-pressure fluid toward the high-pressure fluid side.

According to this feature, despite the positive pressure generating mechanism provided to improve the lubricity by broadening the space between the sealing faces and forming a film of fluid between the sealing faces, and the provision of the pressure releasing groove which plays a role of releasing fluid, said fluid being about to flow in toward the low-pressure side under a pressure generated by the high-pressure side positive pressure generating mechanism on the high-pressure fluid side, the precipitation, adhesion and accumulation of a deposition-causing substance through the dehydration condensation reaction of high-pressure fluid can be prevented and the occurrence of cavitation can be also prevented.

Advantageous Effects of Invention

The present invention has excellent effects as will be described below.

(1) Since the buffer groove provided in the sealing face on the low-pressure side of the fluid discharge means functions as a buffer for the low-pressure fluid, which penetrates from the low-pressure fluid side onto the sealing face, against the high-pressure fluid, the time until the sealing face is filled with the low-pressure fluid can be delayed to suppress the dehydration condensation reaction of the high-pressure fluid.

When the low-pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

Even if a sudden pressure drop occurs due to a discharge of fluid by the fluid discharge means, the occurrence of cavitation can be prevented since the sudden pressure drop is reduced by the fluid existing in the buffer groove.

(2) The capacity of the buffer groove can be increased while securing the sealing face by forming the buffer groove in a semicircular, rectangular or dovetail shape in cross-section, setting the width b of the buffer groove at 10 to 500 μm, and setting the depth h of the buffer groove at 1 to 2 times the width b.

(3) Even when a spiral groove or reverse Rayleigh step which is associated with a potential sudden pressure drop is adopted as the fluid discharge means, the precipitation, adhesion and accumulation of a deposition-causing substance through the dehydration condensation reaction of a high-pressure fluid can be prevented and the occurrence of cavitation can be also prevented.

(4) Even when a fluid circulation groove, which plays a role of actively introducing and discharging the sealed fluid from the high-pressure fluid side onto and from the sealing face, is provided in the sealing face for preventing fluid and corrosion products and the like contained therein from concentrating on the sealing face, is provided in addition to the spiral groove or reverse Rayleigh step, the precipitation, adhesion and accumulation of a deposition-causing substance through the dehydration condensation reaction of high-pressure fluid can be prevented and the occurrence of cavitation can be also prevented.

(5) The lubricity can be improved by broadening the space between relatively sliding sealing faces by the positive pressure generating mechanism and forming a film of fluid between the sealing faces, and the sealing performance between the sealing faces can be also improved by releasing the positive pressure (dynamic pressure), which has been generated by the positive pressure generation mechanism on the high-pressure fluid side, to the pressure of the fluid on the high-pressure side through the pressure releasing groove to prevent the fluid from flowing into the fluid discharge means and the negative pressure generating capability of the fluid discharge means from being lessened.

(6) A gentle flow of fluid is produced in the deep groove constituted by the pressure releasing groove and the radial groove. Therefore, bubbles, impurities or the like are prevented from staying in the deep groove, fluid which is about to flow in toward the low-pressure side can be surely released to the high-pressure fluid side under a pressure generated by the positive pressure generating mechanism on the high-pressure side, and the sealing performance can be thus improved.

(7) Even when the positive pressure generating mechanism, which is provided for improving the lubricity by broadening the space between the sealing faces and forming a film of fluid between the sealing faces, and the pressure releasing groove, which plays a role of releasing fluid, said fluid being about to flow in toward the low-pressure side under a pressure generated by the positive pressure generating mechanism on the high-pressure side, are provided, the precipitation, adhesion and accumulation of a deposition-causing substance through the dehydration condensation reaction of high-pressure fluid can be prevented and the occurrence of cavitation can be also prevented.

BRIEF DESCRIPTION OF DRAWINGS

FIGS. 9A and 9B are views for explaining a positive pressure generating mechanism composed of a Rayleigh step mechanism or the like and a negative pressure generating mechanism composed of a reverse Rayleigh step mechanism or the like, in which FIG. 9A shows the Rayleigh step mechanism and FIG. 9B shows the reverse Rayleigh step mechanism.

DESCRIPTION OF EMBODIMENTS

Modes for carrying out the present invention will be hereinafter described by way of example based on embodiments with reference to the drawings. The dimensions, materials, shapes and relative arrangements of component parts described in the embodiments are, however, never intended to limit the scope of the present invention only to them unless particularly expressly described.

First Embodiment

Figure 1:
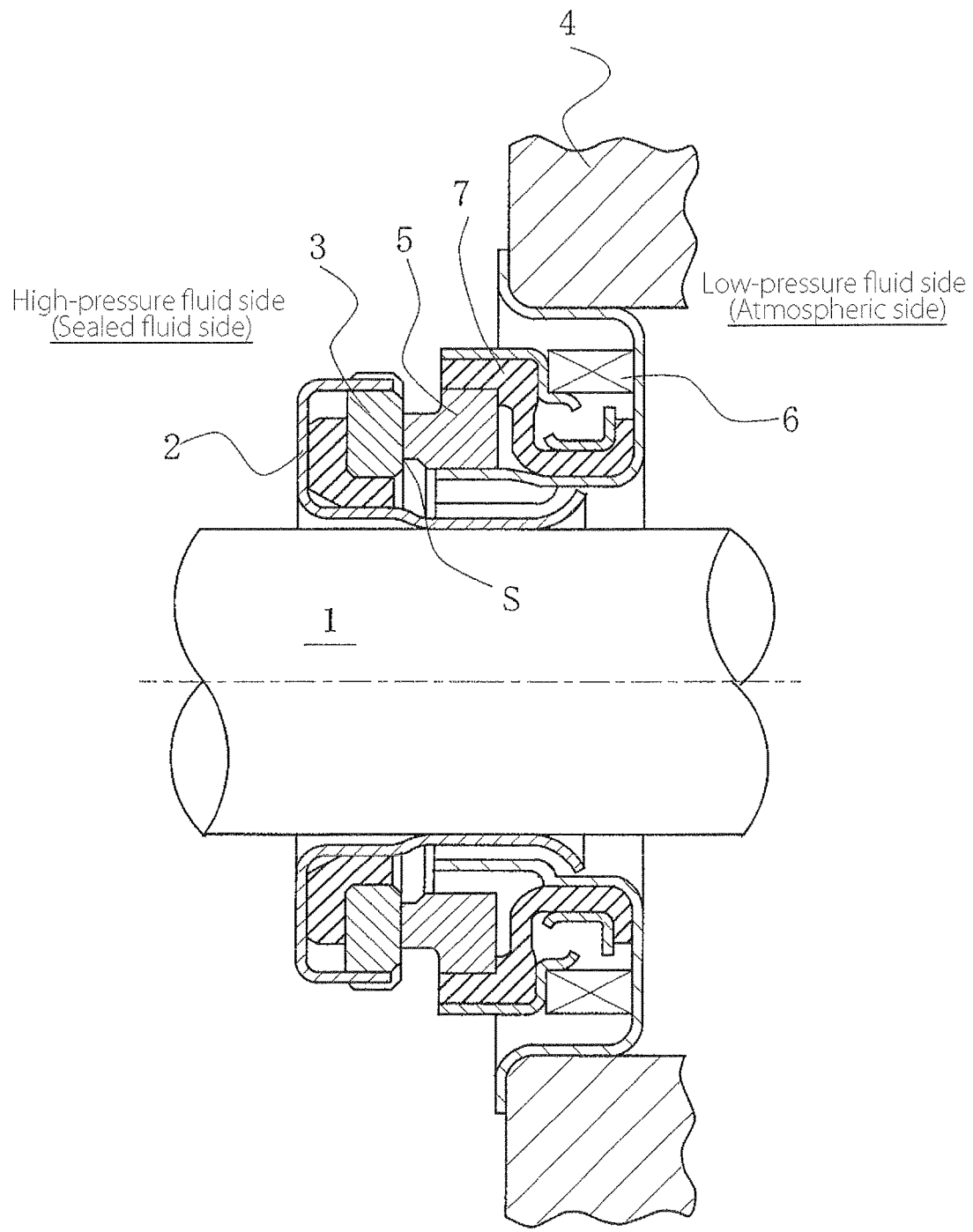
FIG. 1 is a vertical cross-sectional view showing one example of a mechanical seal according to a first embodiment of the present invention.
Figure 2:
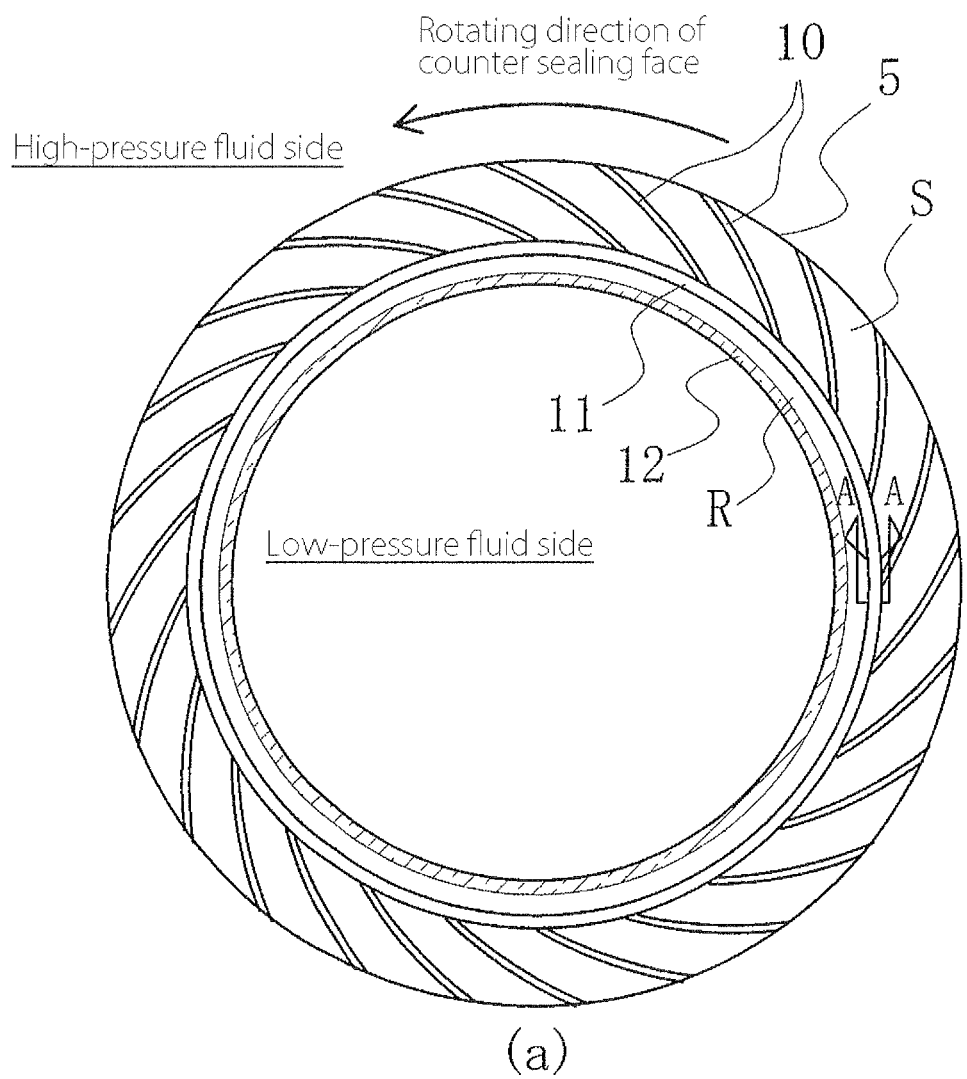
FIG. 2A shows a sealing face of a sliding component according to the first embodiment of the present invention.
FIGS. 2B to 2D are A-A cross-sectional views of FIG. 2A.

A sliding component according to a first embodiment of the present invention is described in reference to FIG. 1 and FIG. 2.

In this embodiment, a description will be made taking, as an example, a mechanical seal that is one example of sliding components. Although an outer circumferential side of each sliding component, which constitutes the mechanical seal, is taken as a high-pressure fluid side (sealed fluid side) and its inner circumferential side as a low-pressure fluid side (atmospheric side) in the following description, the present invention is never limited thereto, and can be applied to a case in which the high pressure fluid side and the low pressure fluid side are reversed.

FIG. 1 is a vertical cross-sectional view showing one example of a mechanical seal that is an inside mechanical seal configured to ensure the sealing of sealed fluid on the high-pressure fluid side although the sealed fluid is apt to leak from an outer periphery of each sealing face toward an inner periphery thereof. The mechanical seal is provided with an annular rotating ring 3 as one of the sliding components and an annular stationary ring 5 as the other sliding component. The annular rotating ring 3 is disposed on the side of a rotating shaft 1 for driving a pump impeller (not shown) located on the high-pressure fluid side through a sleeve 2 in such a state that it is rotatable integrally with the rotating shaft 1. The annular stationary ring 5 is disposed in a housing 4 of the pump in such a state that it is non-rotatable but movable in an axial direction. The rotating ring 3 and stationary ring 5 are slidable in close contact with each other at sealing faces S thereof, which have been mirror-finished by lapping or the like, by a coiled wave spring 6 and a bellows spring 7, because the stationary ring 5 is biased in an axial direction by the coiled wave spring 6. This mechanical seal, therefore, prevents the sealed fluid from flowing from the outer periphery of the rotating shaft 1 to the atmospheric side between the respective sealing faces S of the rotating ring 3 and stationary ring 5.

FIG. 2A shows a sealing face of a sliding component according to Embodiment 1 of the present invention, which will be described taking, as an example, a case that the fluid discharge means and buffer groove, which pertain to the present invention, are formed, for example, in the sealing face S of the stationary ring 5 of FIG. 1.

The following description equally applies when the fluid discharge means and buffer groove, which pertain to the present invention, are formed in the sealing face S of the rotating ring 3.

In FIG. 2A, it is assumed that the outer peripheral side of the sealing face S of the stationary ring 5 corresponds to the high-pressure fluid side, the inner peripheral side corresponds to the low-pressure fluid side, for example, the atmospheric side, and the counter sealing face rotates counterclockwise.

Pumping grooves 10 as the fluid discharge means for discharging fluid to the high-pressure fluid side by relative sliding with the counter sealing face are provided in the sealing face S. The pumping grooves 10 are in communication with the high-pressure fluid side, and are isolated from the low-pressure fluid side by a smooth part R (which may also be referred to as "land part R" in the present invention) of the sealing face S. The pumping grooves 10 are formed in a linear or curved shape so as to have an angle for discharging fluid to the high-pressure fluid side by relative sliding with the counter sealing face. In this embodiment, the pumping grooves are formed in a spiral shape along the rotating direction of the counter sealing face in consideration for vibrations, noises and the like.

In this description, a pumping groove of spiral shape is called a "spiral groove", and a description will hereinafter be made about a case in which such pumping grooves are the spiral grooves 10.

A buffer groove 11 is provided in the smooth part R on the low-pressure side of the spiral grooves 10. In FIG. 2A, the buffer groove 11 is provided in an annular form such that it extends along the low pressure-side ends of the spiral grooves 10.

With respect to the radial position of the buffer groove 11 in the sealing face S, the buffer groove 11 is located on the low-pressure side of the spiral groove 10 and is isolated from the low-pressure fluid side by the land part R.

The cross-sectional shape of the buffer groove 11 may be, for example, in a semicircular shape as shown in FIG. 2B, a rectangular shape as shown in FIG. 2C, or a dovetail groove shape as shown in FIG. 2D, but is not limited thereto. Further, the size of the buffer groove 11 is determined according to the capability or the like of the spiral grooves 10 as the fluid discharge means, and is set in a size having a capacity capable of storing fluid to an extent. For example, the width b of the buffer groove 11 may be set preferably at 10 to 500 μm, more preferably at 50 to 200 μm. The depth h of the buffer groove 11 may be set preferably at 1 to 2 times the width b.

The buffer groove 11 has a buffering action to reduce instantaneous penetration of low-pressure fluid to the low-pressure side of the sealing face under the fluid discharging action (sealing action) of the spiral grooves 10, and functions as a buffer for the low-pressure fluid, which penetrates from the low-pressure fluid side onto the sealing face, against the high-pressure fluid, whereby the time until the sealing face is filled with the low-pressure fluid can be delayed to suppress the dehydration condensation reaction of the high-pressure fluid.

When the low pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

In the case of FIG. 2, the penetration of low-pressure fluid 12 is limited to only a small part of the sealing face on the low-pressure side under the buffer effect of the buffer groove 11, and the high-pressure fluid remain covering from a vicinity of the buffer groove 11 to the high-pressure side.

Even if a sudden pressure drop occurs due to a discharge of fluid through the spiral grooves 10, the occurrence of cavitation is prevented since the sudden pressure drop is reduced by the fluid existing in the buffer groove 11.

Second Embodiment

A sliding component according to a second embodiment of the present invention will be described with reference to FIG. 3.

Figure 3:
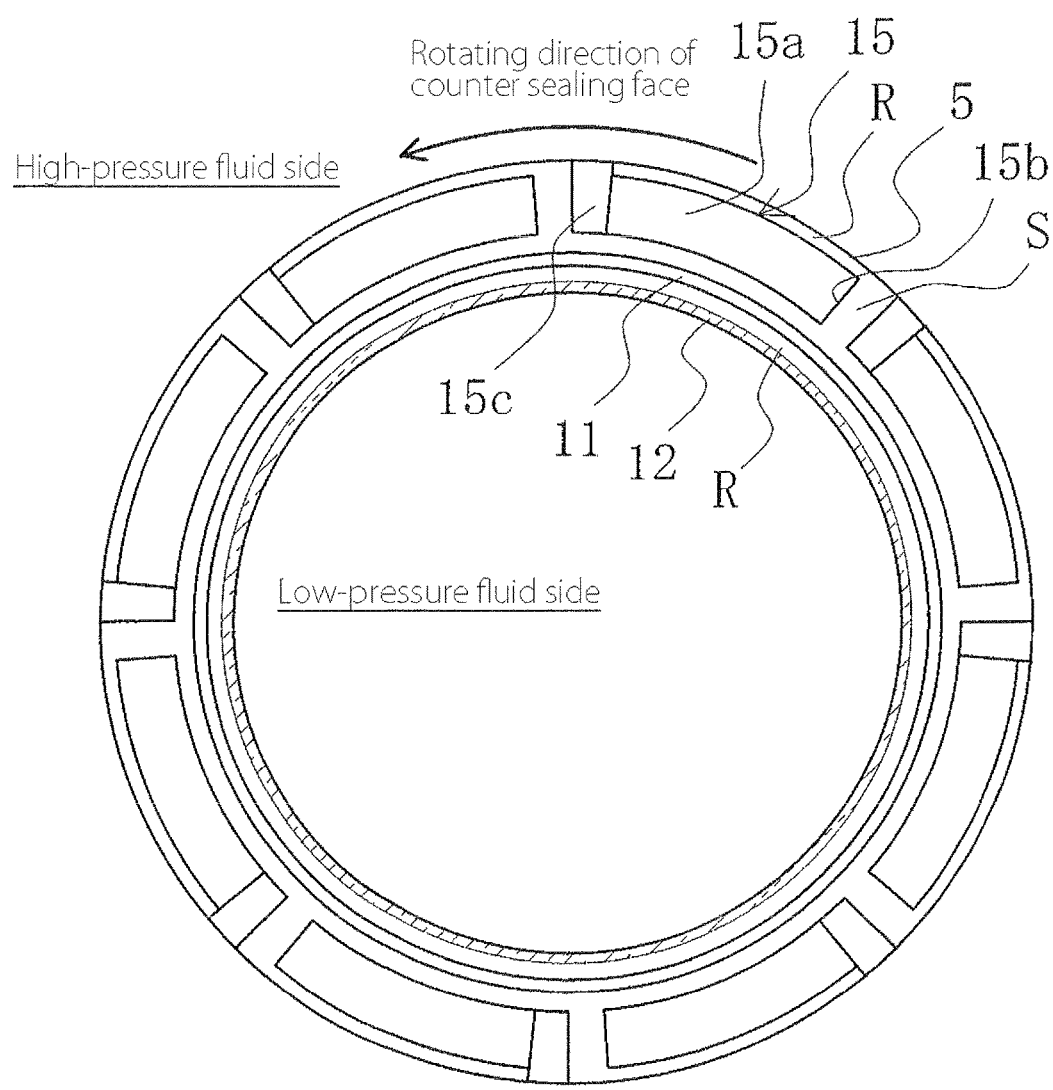
FIG. 3 shows a sealing face of a sliding component according to a second embodiment of the present invention.

In FIG. 3, the same reference signs as those in FIG. 2 designate the same members as in FIG. 2, and their description is omitted herein.

In a sliding component 5 shown in FIG. 3, a plurality of reverse Rayleigh step mechanisms 15 as a fluid discharge means are provided in a circumferential direction in the sealing face on the high-pressure side.

Although these reverse Rayleigh step mechanisms 15 will be described later in detail, fluid is drawn in through grooves 15a and reverse Rayleigh steps 15b which constitute negative pressure generating grooves composed of shallow grooves isolated from the high-pressure fluid side by land portions R, and the fluid is discharged to the high-pressure fluid side through radial grooves 15c composed of deep grooves communicating to the high-pressure fluid side.

A buffer groove 11 is provided in a smooth part R on the low-pressure side of the reverse Rayleigh step mechanism 15. In FIG. 3, the buffer groove 11 is provided in an annular form and apart from the reverse Rayleigh step mechanism 15 toward the low-pressure fluid side.

With respect to the radial position of the buffer groove 11 in the sealing face, the buffer groove 11 is located on the low-pressure side of the reverse Rayleigh step mechanism 15 and isolated from the low-pressure side by the land part R.

The reverse Rayleigh step mechanisms will be described later in detail.

The cross-sectional shape, size and the like of the buffer groove 11 are the same as in the first embodiment.

The buffer groove 11 has a buffering action to reduce the instantaneous penetration of low-pressure fluid to the low pressure side of the sealing face under the fluid discharging action (sealing action) of the reverse Rayleigh step mechanisms 15, and functions as a buffer for the low-pressure fluid, which penetrates from the low-pressure fluid side onto the sealing face, against the high-pressure fluid, whereby the time until the sealing face is filled with the low-pressure fluid can be delayed to suppress the dehydration condensation reaction of the high-pressure fluid.

When the low-pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

In the case of FIG. 3, the penetration of low-pressure fluid 12 is limited to only a small part of the sealing face on the low-pressure side under the buffer effect of the buffer groove 11, and the high-pressure fluid remains covering from a vicinity of the buffer groove 11 to the high-pressure side.

Even if a sudden pressure drop occurs due to a discharge of fluid through the reverse Rayleigh step mechanisms 15, the occurrence of cavitation is prevented since the sudden pressure drop is reduced by the fluid existing in the buffer groove 11.

Third Embodiment

A sliding component according to a third embodiment of the present invention will be described with reference to FIG. 4.

Figure 4:
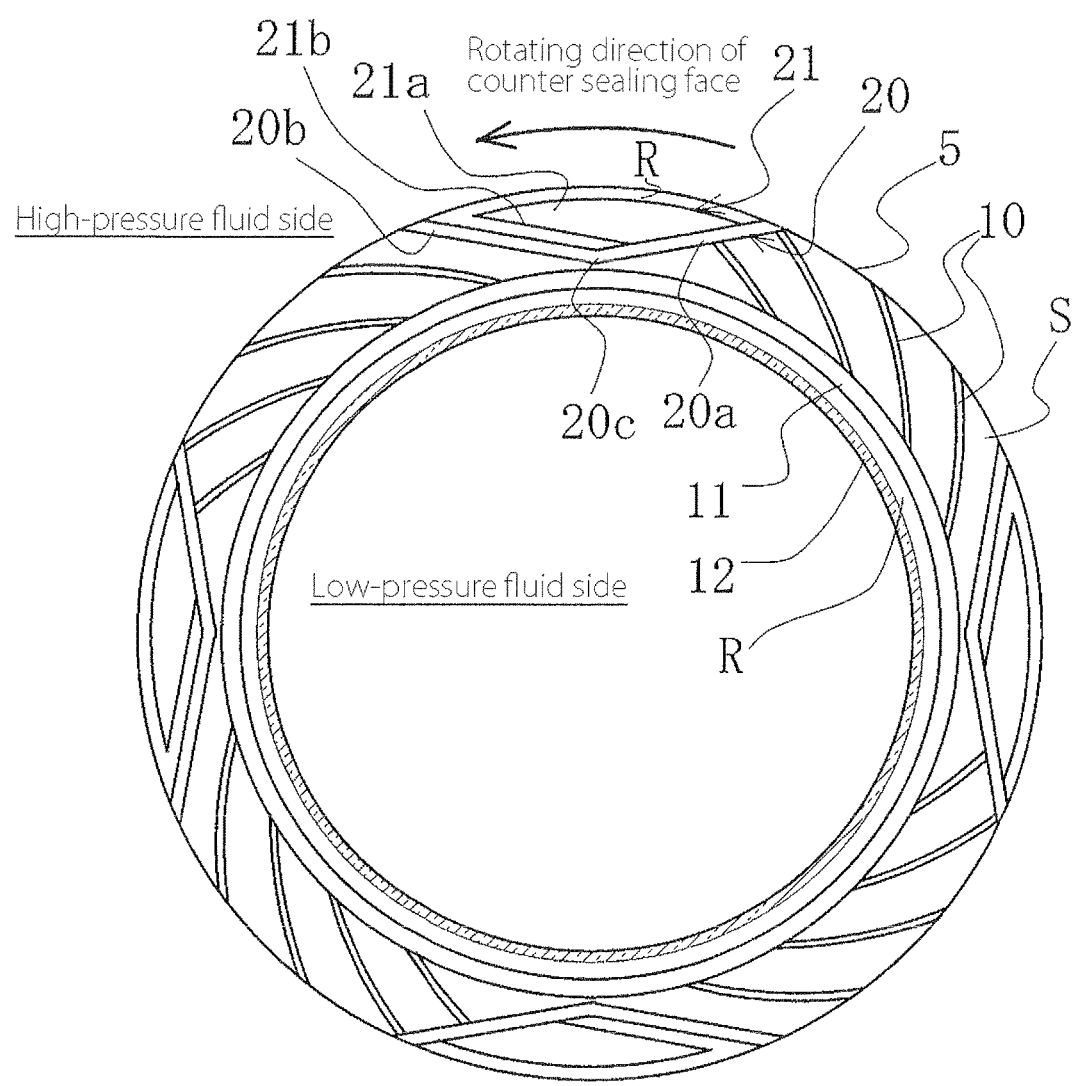
FIG. 4 shows a sealing face of a sliding component according to a third embodiment of the present invention.

In FIG. 4, the same reference signs as those in FIG. 2 designate the same members as in FIG. 2, and their description is omitted herein.

In FIG. 4, a plurality of fluid circulation grooves 20, as a fluid circulating means, are provided in a circumferential direction in a sealing face of a stationary ring 5. The fluid circulation grooves are in communication with the high-pressure fluid side, and are isolated from the low-pressure fluid side by a land part R of the sealing face.

Each fluid circulation groove 20 is composed of an inlet portion 20a for introducing fluid from the high-pressure fluid side, an outlet portion 20b for discharging the fluid to the low-pressure fluid side and a communicating portion 20c communicating the inlet portion 20a and the outlet portion 20b with each other in the circumferential direction, and is isolated from the low-pressure fluid side by the land part R. The fluid circulation groove 20 plays a role of actively introducing and discharging sealed fluid from the high-pressure fluid side onto and from the sealing face for preventing the concentration of fluid and corrosion products and the like contained therein on the sealing face. The inclinations of the inlet portion 20a and outlet portion 20b are set to be large to facilitate the introduction and discharge of sealed fluid onto and from the sealing face along the rotating direction of the counter sealing face, both of them are disposed so as to cross each other on the low-pressure fluid side (the inner peripheral side in FIG. 4), and this crossing point forms the communicating portion 20c. The crossing angle between the inlet portion 20a and the outlet portion 20b is an obtuse angle (for example, about 150°).

Spiral grooves 10 for discharging fluid to the high-pressure fluid side by relative sliding between the rotating ring 3 and the stationary ring 5 are provided on the outside of parts of the sealing face of the stationary ring 5, said parts being surrounded by the fluid circulation grooves 20, and the high-pressure fluid side, in other words, between the adjacent fluid circulation grooves 20 and 20.

In the sealing face provided with the fluid circulation grooves 20, a positive pressure generating mechanisms 21 each of which includes a groove 21a shallower than the fluid circulation grooves 20 are provided at portions enclosed by the fluid circulation groove 20 and the high-pressure fluid side. The positive pressure generating mechanisms 21 are provided to improve the lubricity by broadening the space between relatively sliding sealing faces through the generation of a positive pressure (dynamic pressure) and forming a film of fluid between the sealing faces.

Each groove 21a is in communication with the inlet portion 20a of the fluid circulation groove 20, and is isolated from the outlet portion 20b and the high-pressure fluid side by the land portion R.

In this embodiment, each positive pressure generating mechanism 21 is composed of a Rayleigh step mechanism provided with the groove 21a, which communicates to the inlet portion 20a of the fluid circulation groove 20, and a Rayleigh step 21b, but without being limited thereto, may also be composed, for example, of a dammed femto groove, and in essence, any mechanism can be adopted insofar as it can generate a positive pressure.

The Rayleigh step mechanisms will be described later in detail.

A buffer groove 11 is provided in a smooth part R on the low-pressure side of the fluid circulation grooves 20 and spiral grooves 10. In FIG. 4, the buffer groove 11 is provided in an annular form such that it is apart from the fluid circulation grooves 20 toward the low-pressure fluid side and extends along low pressure-side ends of the spiral grooves 10.

With respect to the radial position of the buffer groove 11 in the sealing face, the buffer groove 11 is located on the low-pressure side of the fluid circulation grooves 20 and spiral grooves 10, and isolated from the low-pressure fluid side by the land part R.

The cross-sectional shape, size and the like of the buffer groove 11 are the same as in the first embodiment.

The buffer groove 11 has a buffering action to reduce the instantaneous penetration of low-pressure fluid to the low-pressure side of the sealing face under the fluid discharging action (sealing action) of the spiral grooves 10, and functions as a buffer of the low-pressure fluid, which penetrates from the low-pressure fluid side onto the sealing face, against the high-pressure fluid, whereby the time until the sealing face is filled with the low-pressure fluid can be delayed to suppress the dehydration condensation reaction of the high-pressure fluid.

When the low-pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

In the case of FIG. 4, the penetration of low-pressure fluid 12 is limited to only a small part of the sealing face on the low-pressure side under the buffer effect of the buffer groove 11, and the high-pressure fluid remains covering from a vicinity of the buffer groove 11 to the high-pressure side.

Even if a sudden pressure drop occurs due to a discharge of fluid through the spiral grooves 10, the occurrence of cavitation is prevented since the sudden pressure drop is reduced by the fluid existing in the buffer groove 11.

Fourth Embodiment

A sliding component according to a fourth embodiment of the present invention will be described with reference to FIG. 5.

Figure 5:
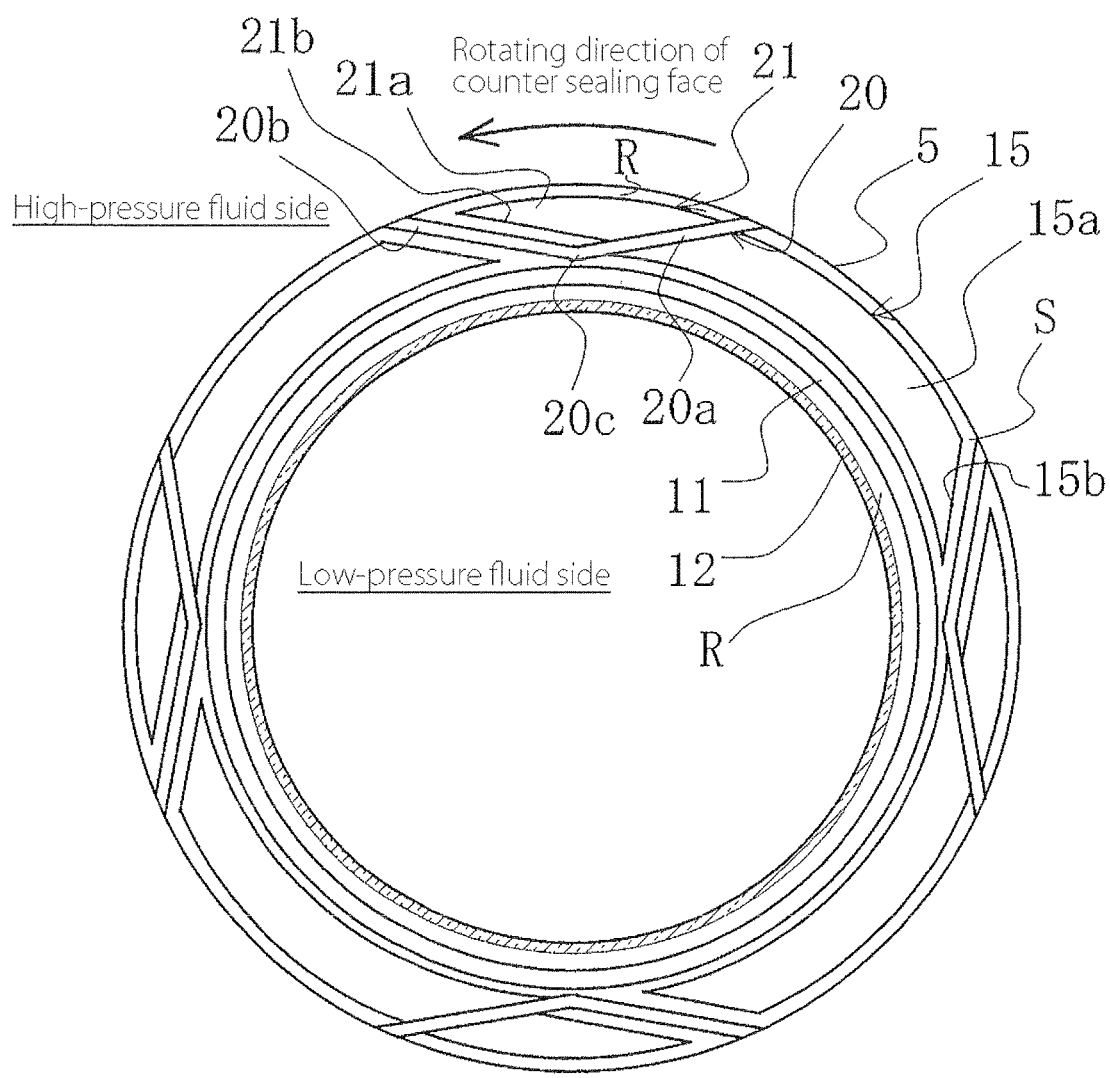
FIG. 5 shows a sealing face of a sliding component according to a fourth embodiment of the present invention.

In FIG. 5, the same reference signs as those in FIGS. 2 and 4 designate the same members as in FIGS. 2 and 4, and their description is omitted herein.

In FIG. 5, a plurality of fluid circulation grooves 20, as a fluid circulating means, are provided in a circumferential direction in a sealing face of a stationary ring 5. The fluid circulation grooves are in communication with the high-pressure fluid side, and are isolated from the low-pressure fluid side by a land part R of the sealing face.

A plurality of reverse Rayleigh step mechanisms 15 for discharging fluid to the high-pressure fluid side by relative sliding between the rotating ring 3 and the stationary ring 5 are provided in a circumferential direction on the outside of parts of the sealing face of the stationary ring 5, said parts being enclosed by the fluid circulation groove 20, and the high-pressure fluid side, in other words between the adjacent fluid circulation grooves 20 and 20.

In the sealing face provided with the fluid circulation grooves 20, a positive pressure generating mechanism 21 including a groove 21a shallower than the fluid circulation grooves 20 is provided at portions enclosed by the fluid circulation grooves 20 and the high-pressure fluid side.

A buffer groove 11 is provided in a smooth part R on a low-pressure side of the fluid circulation grooves 20 and the reverse Rayleigh step mechanisms 15. In FIG. 5, a buffer groove 11 is provided in an annular form and apart from the fluid circulation grooves 20 and reverse Rayleigh step mechanisms 15 toward the low-pressure fluid side.

With respect to the radial position of the buffer groove 11 in the sealing face, the buffer groove 11 is located on the low-pressure side of the fluid circulation grooves 20 and the reverse Rayleigh step mechanisms 15 and is isolated from the low-pressure fluid side by the land part R.

The cross-sectional shape, size and the like of the buffer groove 11 are the same as in the first embodiment.

The buffer groove 11 has a buffering action to reduce the instantaneous penetration of low-pressure fluid to the low-pressure side of the sealing face under the fluid discharge action (sealing action) of the reverse Rayleigh step mechanisms 15, and functions as a buffer for the low-pressure fluid, which penetrates from the low-pressure fluid side onto the sealing face against the high-pressure fluid, whereby the time until the sealing face is filled with the low-pressure fluid can be delayed to suppress the dehydration condensation reaction of the high-pressure fluid.

When the low-pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

In the case of FIG. 3, the penetration of low-pressure fluid 12 is limited to only a small part of the sealing face on the low pressure side under by the buffer effect of the buffer groove 11, and the high-pressure fluid remains covering from a vicinity of the buffer groove 11 to the high-pressure side.

Even if a sudden pressure drop occurs due to a discharge of fluid through the spiral grooves 10, the occurrence of cavitation is prevented since the sudden pressure drop is reduced by the fluid existing in the buffer groove 11.

Fifth Embodiment

A sliding component according to a fifth embodiment of the present invention will be described with reference to FIG. 6.

Figure 6:
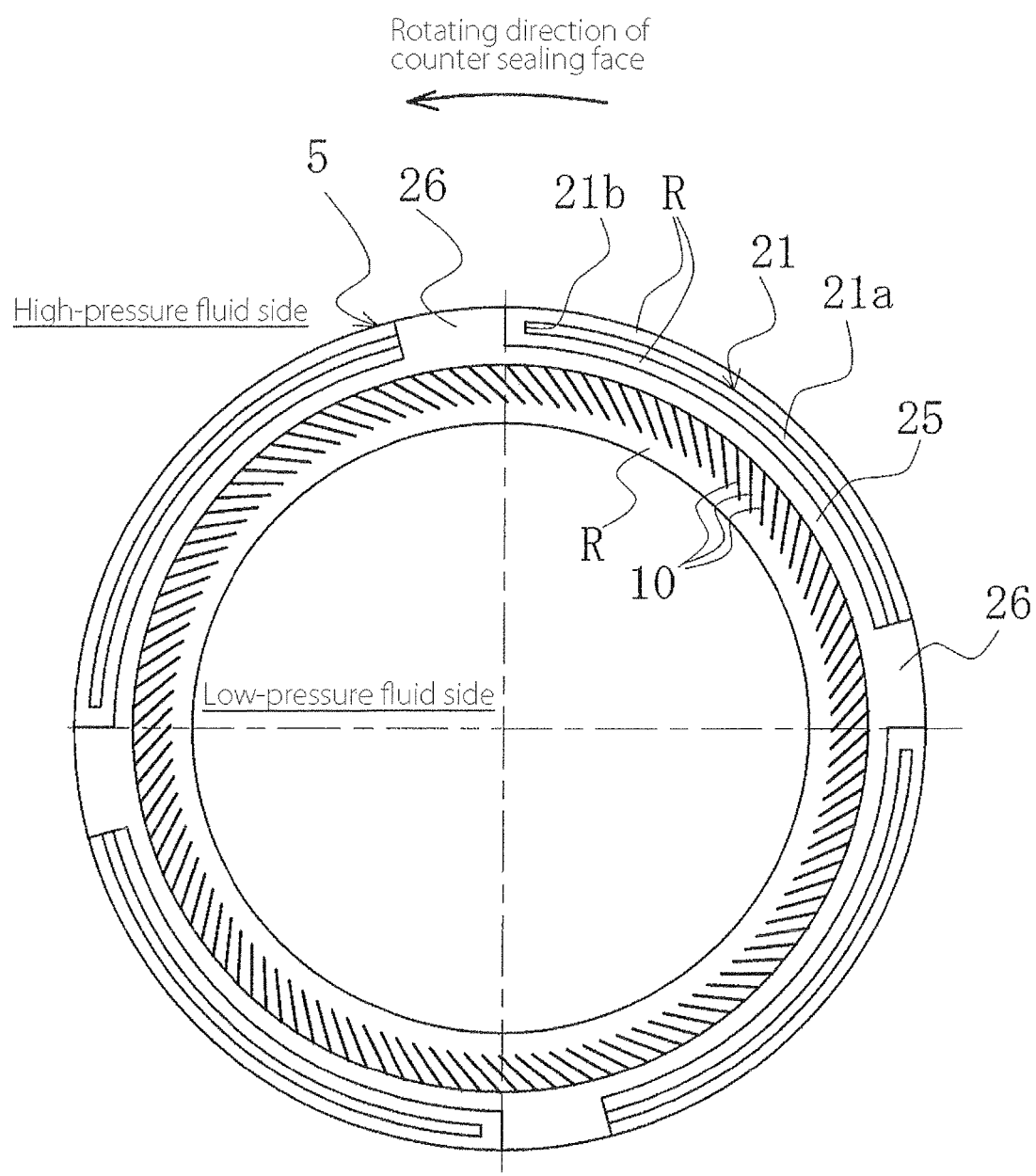
FIG. 6 shows a sealing face of a sliding component according to a fifth embodiment of the present invention.

In FIG. 6, the same reference signs as those in FIGS. 2 and 4 designate the same members as in FIGS. 2 and 4, and their description is omitted herein.

In FIG. 6, positive pressure generating mechanisms 21, for example, Rayleigh step mechanisms which are each provided with a groove 21a and a Rayleigh step 21b, are provided in a sealing face on the high-pressure fluid side. The positive pressure generating mechanisms 21 are isolated from the high-pressure fluid side and the low-pressure fluid side by land portions R, and are disposed at four equidistant positions with equal intervals in a circumferential direction.

Spiral grooves 10 are disposed in an annular form in the sealing face on the low-pressure fluid side of the positive pressure generating mechanisms 21 such that they are separated from the positive pressure generating mechanisms 21 in a radial direction.

In addition, an annular pressure releasing groove 25 is provided continuously in the circumferential direction such that it is located between the spiral grooves 10 and the positive pressure generating mechanisms 21. The pressure releasing groove 25 is separated from the grooves 21a of the positive pressure generating mechanisms 21 in the radial direction by the land portions R, and is connected to discharge-side ends (downstream ends) of the spiral grooves 10.

Although the positive pressure generating mechanisms 21 are provided at four positions with equal intervals in this embodiment, at least one positive pressure generating mechanism may suffice the need without being limited thereto.

Radial grooves 26 are provided to communicate the pressure releasing groove 25 and the high-pressure fluid side with each other. The radial grooves 26 are provided as many as four at equal intervals at positions where they are in contact with upstream ends of the groove portions 21a of the positive pressure generating mechanisms 21 as viewed in the circumferential direction and extend in directions orthogonal to tangents of the pressure releasing groove 25. The pressure releasing groove 25 and radial grooves 26 are deeper than the grooves 21a of the positive pressure generating mechanisms 21. The radial grooves 26 are formed with a width larger than that of the pressure releasing groove 25 in this embodiment.

The positive pressure generating mechanisms 21 are provided to improve the lubricity by broadening the space between relatively sliding sealing faces through the generation of a positive pressure (dynamic pressure) and forming a film of fluid between the sealing faces.

The pressure releasing groove 25 is provided to prevent the negative pressure generating capability of the spiral grooves 10 from being lessened due to a flow of fluid into the spiral grooves 10 on the low-pressure side by releasing a positive pressure (dynamic pressure) generated at the positive pressure generating mechanism 21 on the high-pressure side to the pressure of the fluid on the high-pressure side, and plays a role of guiding the fluid, which is about to flow toward the low-pressure side, into the pressure releasing groove 25 under the pressure generated by the positive pressure generating mechanisms 21 on the high-pressure side and releasing it to the high-pressure fluid side. Accordingly, the sealing performance at the sealing face can be further improved.

Sixth Embodiment

A sliding component according to a sixth embodiment of the present invention is described with reference to FIG. 7.

This embodiment has the same configurations as the fifth embodiment of FIG. 6 except that it is different in the directions of the radial grooves is from the fifth embodiment, and the same reference signs as those in FIG. 6 designate the same members as in FIG. 6, and their description is omitted herein.

Figure 7:
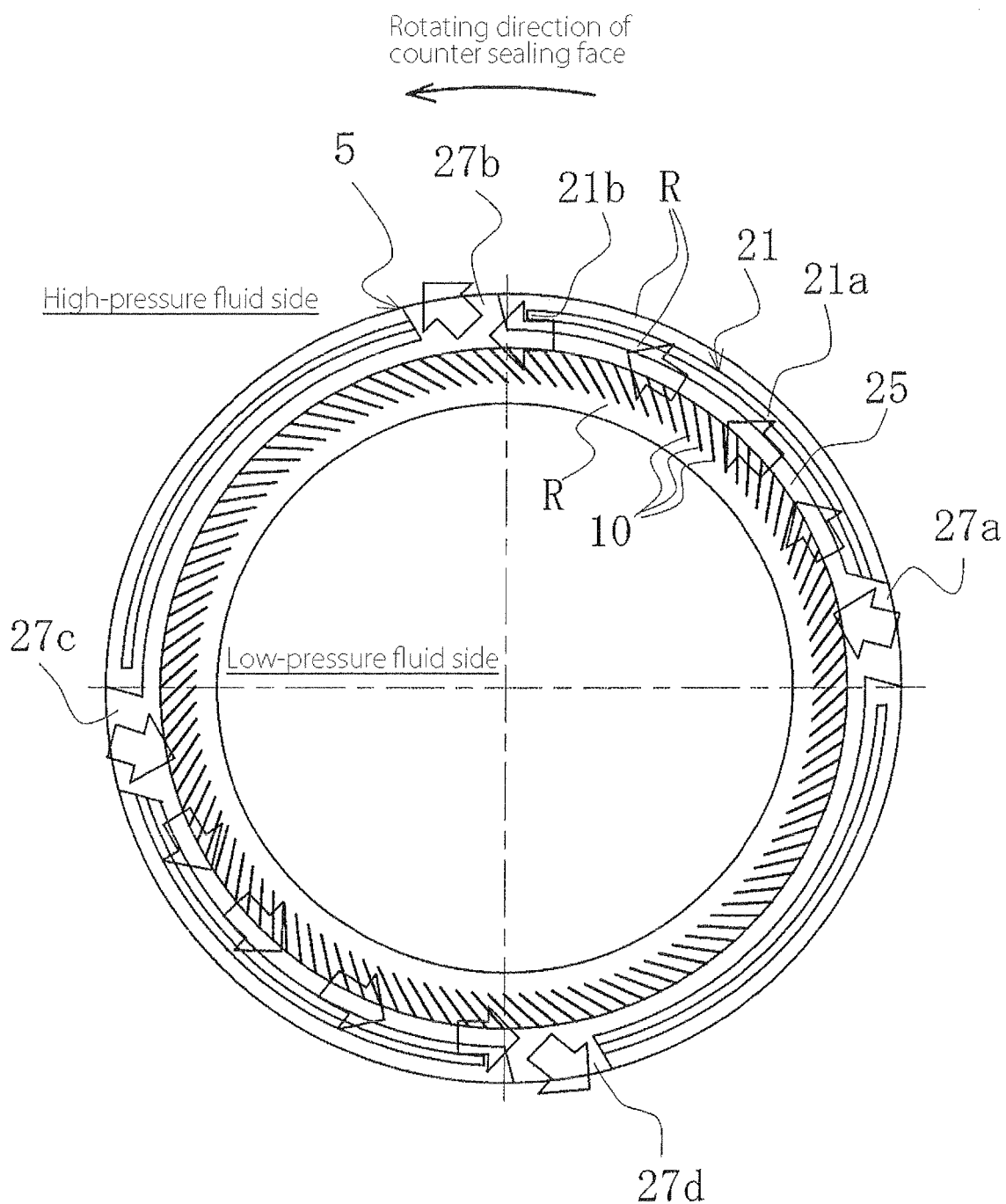
FIG. 7 shows a sealing face of a sliding component according to a sixth embodiment of the present invention.

In FIG. 7, radial grooves 27 are different in the direction of arrangement from the fifth embodiment although it is the same as the fifth embodiment in that they are at equal intervals as many as four at positions where they are in contact with upstream ends of groove 21a of positive pressure generating mechanisms 21.

Described specifically, the radial grooves 27 are provided such that four radial grooves 27a, 27b, 27c, and 27d are grouped in two pairs and that in the radial grooves 27a and 27b in one pair or the radial grooves 27c in the other pair, inlets of the radial grooves 27a (27c) on an upstream side, that is, on inlet sides are inclined toward the upstream side to facilitate the entry of fluid, and outlets of the radial grooves 27b (27d) on outlet sides are inclined toward a downstream side to facilitate the discharge of fluid.

In other words, an even number of radial grooves 27 are disposed in a circumferential direction, and are provided such that the adjacent radial grooves 27 are different from each other in the direction of inclination, and that the inlets of the radial grooves 27a, 27c in the one group are inclined toward the upstream side, and the outlets of the radial grooves 27b, 27d in the other group are inclined toward the downstream side.

When the radial grooves 27 are provided as described above, gentle flows of fluid are produced in deep grooves constituted by the pressure releasing groove 25 and the radial grooves 27. Thus, bubbles, impurities and the like are prevented from staying in the deep grooves, the fluid which is about to flow in toward the low-pressure side can be surely released to the high-pressure fluid side under a generated by the positive pressure generating mechanisms 21 on the high-pressure side, and the sealing performance can be thus improved.

Although the positive pressure generating mechanisms 21 are provided at four positions with equal intervals in this embodiment, an even number of positive pressure generating mechanism 21 may suffice the need without being limited thereto.

Seventh Embodiment

A sliding component according to a seventh embodiment of the present invention will be described with reference to FIG. 8.

This embodiment basically has the same configurations as the fifth embodiment of FIG. 6, although it is differed from the fifth embodiment in that eight pressure generating mechanisms are provided at equal intervals, and that a buffer groove is provided. The same reference signs as those in FIG. 6 designate the same members as in FIG. 6, and their description is omitted herein.

Figure 8:
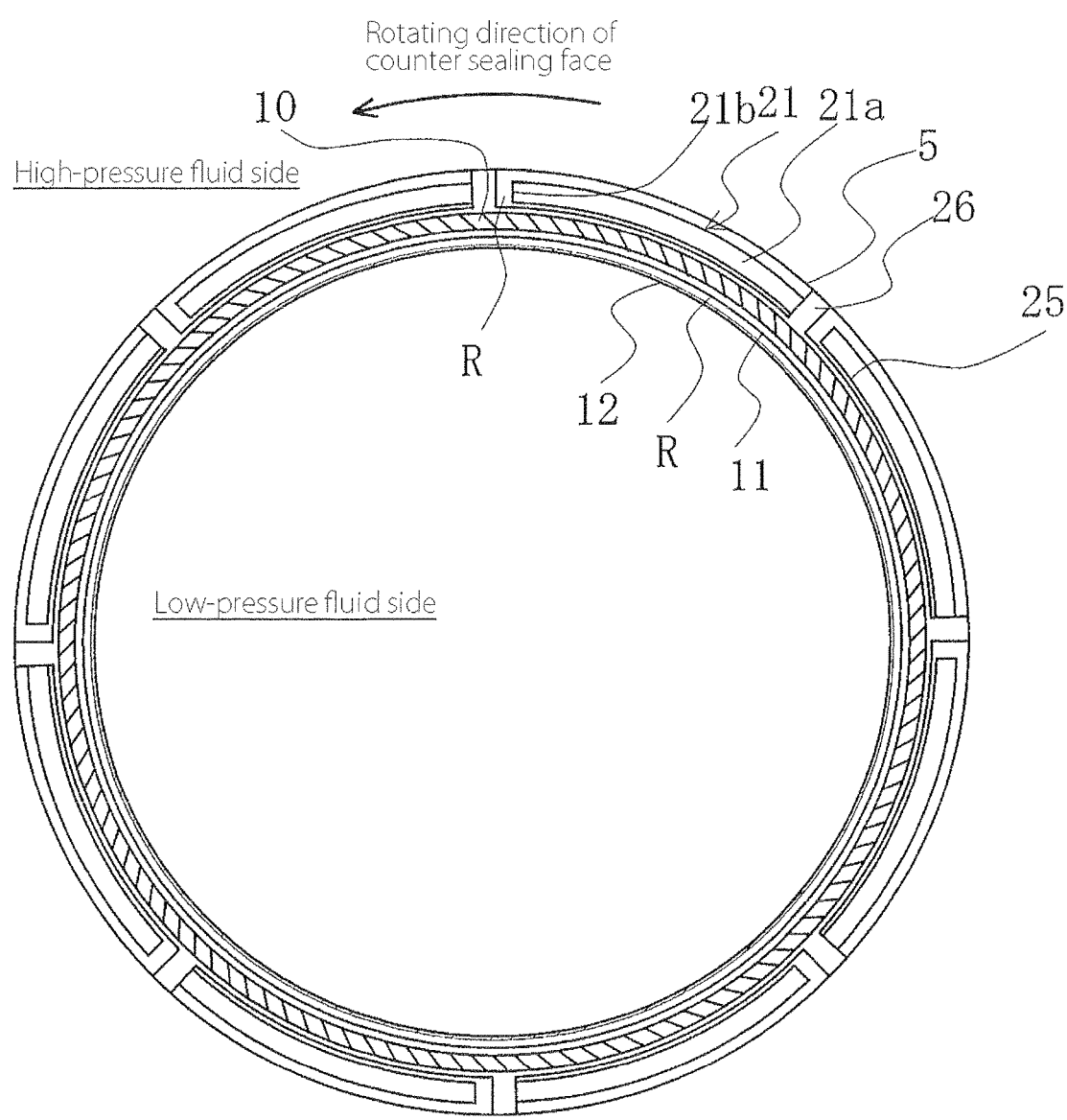
FIG. 8 shows a sealing face of a sliding component according to a seventh embodiment of the present invention.

In FIG. 8, spiral grooves 10 are disposed in an annular form in the sealing face at a radial center thereof, positive pressure generating mechanisms 21, for example, Rayleigh step mechanisms are provided in the sealing face on the high-pressure fluid side of the spiral grooves 10, and a pressure releasing groove 25 is provided such that it is located between the spiral grooves 10 and the positive pressure generating mechanisms 21. Each positive pressure generating mechanism 21 and its corresponding pressure releasing groove 25 are in communication with the high-pressure fluid side through an associated radial groove 26.

The positive pressure generating mechanisms 21 are provided to improve the lubricity by broadening the space between relatively sliding sealing faces through the generation of a positive pressure (dynamic pressure) and forming a film of fluid between the sealing faces.

The pressure releasing groove 25 is provided to prevent the negative pressure generating capability of the spiral grooves 10 from being lessened due to a flow of fluid into the spiral grooves 10 on the low pressure-side by releasing a positive pressure (dynamic pressure) generated at the positive pressure generating mechanism 21 on the high-pressure side to the pressure of the fluid on the high-pressure side, and plays a role of guiding the fluid, which is about to flow toward the low-pressure side, into the pressure releasing groove 25 under the pressure generated by the positive pressure generating mechanisms 21 on the high-pressure side and releasing it to the high-pressure fluid side.

A buffer groove 11 is provided in a smooth part R on the low-pressure side of the spiral grooves 10 as a fluid discharge means. In FIG. 8, the buffer groove 11 is provided in an annular form such that it extends along low pressure-side ends of the spiral grooves 10.

With respect to the radial position of the buffer groove 11 in the sealing face, the buffer groove 11 is located on the low-pressure side of the spiral grooves 10 and is isolated from the low-pressure fluid side by the land part R.

The cross-sectional shape, size and the like of the buffer groove 11 are the same as in the first embodiment.

The buffer groove 11 has a buffering action to reduce the instantaneous penetration of low-pressure fluid to the low pressure side of the sealing face under the fluid discharging action (sealing action) of the spiral grooves 10, and functions as a buffer for the low-pressure fluid, which penetrates from the low-pressure fluid side onto the sealing face against the high-pressure fluid, whereby the time until the sealing face is filled with the low pressure fluid can be delayed to suppress the dehydration condensation reaction of the high-pressure fluid.

When the low-pressure fluid is air, for example, the low-pressure side of the sealing face can be prevented from drying with air. The precipitation, adhesion and accumulation of a deposition-causing substance through the dehydration condensation reaction of the high-pressure fluid can be prevented accordingly.

In the case of FIG. 3, the penetration of low-pressure fluid 12 is limited to only a small part of the sealing face on the low-pressure side under the buffer effect of the buffer groove 11, and the high-pressure fluid remains covering from a vicinity of the buffer groove 11 to the high-pressure side.

Even if a sudden pressure drop occurs due to a discharge of fluid through the spiral grooves 10, the occurrence of cavitation is prevented since the sudden pressure drop is reduced by the fluid existing in the buffer groove 11.

Figure 9:
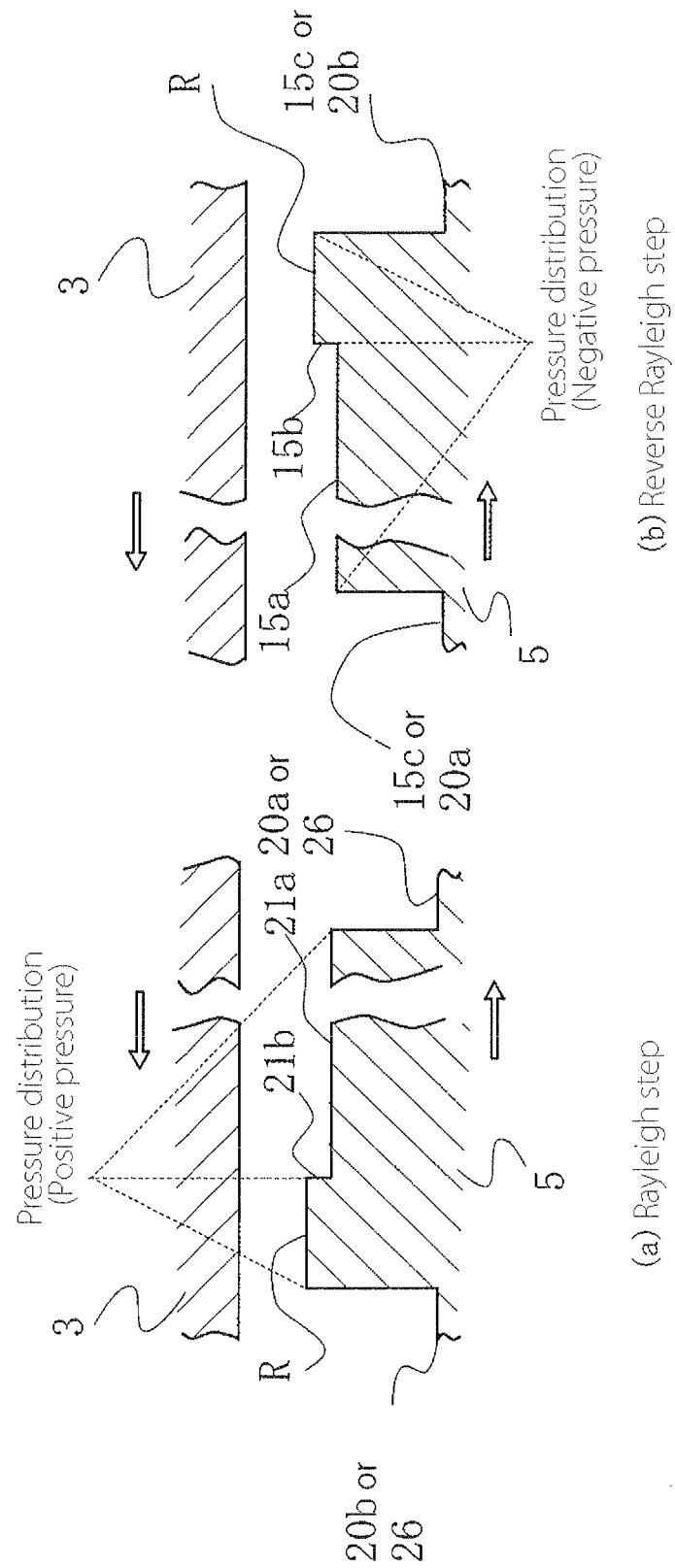
Figure 10:
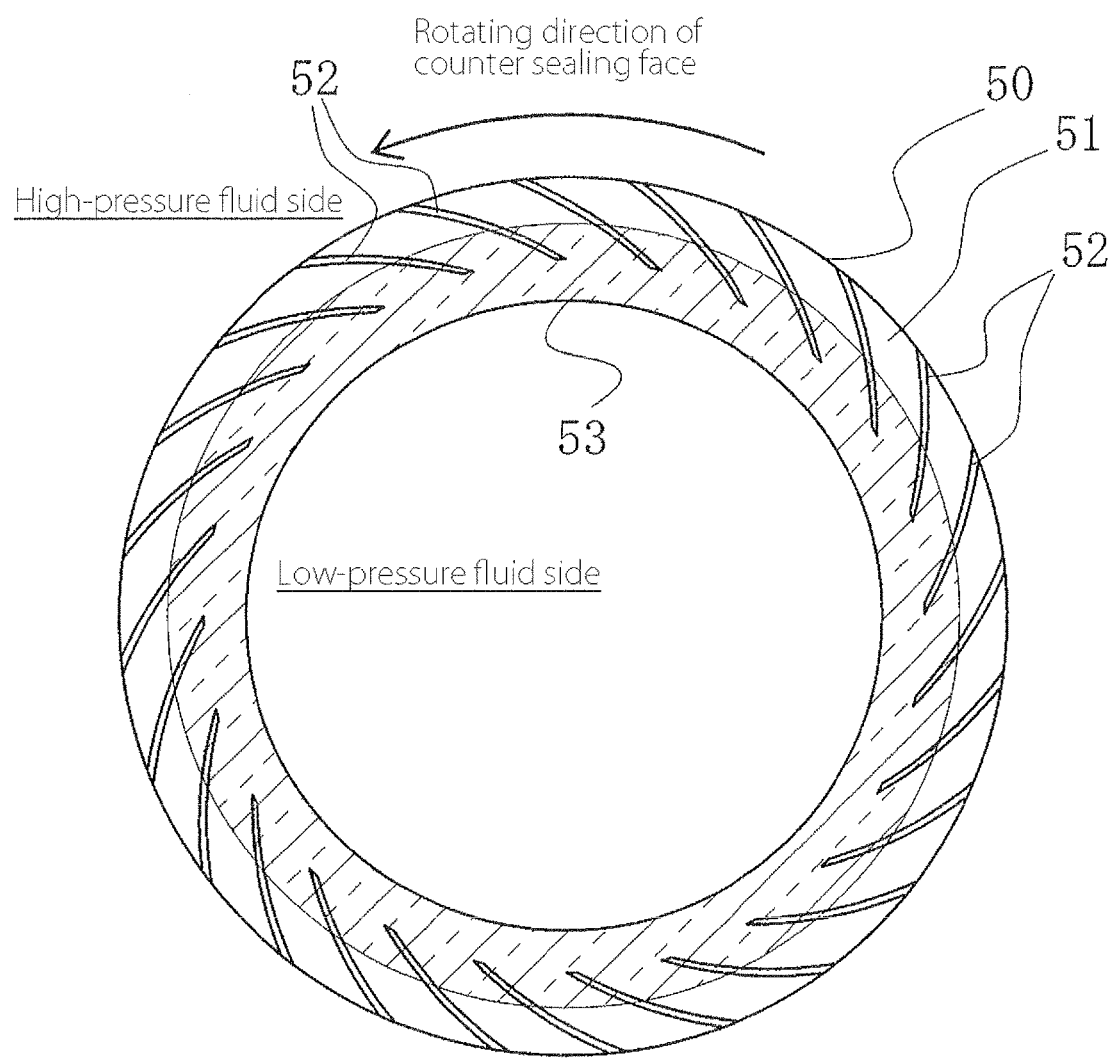
FIG. 10 is a view showing a conventional technology.

Referring next to FIGS. 9A and 9B, a description will be made about a positive pressure generating mechanism composed of a Rayleigh step mechanism or the like and a negative pressure generating mechanism composed of a reverse Rayleigh step mechanism or the like.

In FIG. 9A, a rotating ring 3 and a stationary ring 5, which are opposed sliding components, undergo relative sliding as indicated by arrows. For example, a Rayleigh step 21b is formed in a sealing face of the stationary ring 5 such that it is vertical to the direction of relative movement and faces an upstream side, and a groove 21a that is a positive pressure generating groove is formed on the upstream side of the Rayleigh step 21b. The sealing faces of the opposed rotating ring 3 and stationary ring 5 are flat.

When the rotating ring 3 and stationary ring 5 undergo relative movement in the directions indicated by the arrows, fluid that exists between the sealing faces of the rotating ring 3 and stationary ring 5 is about to move following the moving direction of the rotating ring 3 or stationary ring 5 due to its viscosity. Here, a positive pressure (dynamic pressure) as shown by broken lines is generated due to the presence of the Rayleigh step 21.

Denoted at 20a and 20b are an inlet portion and an outlet portion of a fluid circulation groove, respectively, R indicates a land portion, and 26 is a radial groove.

Also in FIG. 9B, a rotating ring 3 and a stationary ring 5, which are opposed sliding components, undergo relative movement as indicated by arrows, a reverse Rayleigh step 15b is formed on a sealing face of the rotating ring 3 or stationary ring 5 such that it is vertical to the direction of relative movement and faces a downstream side, and a groove 15a that is a negative pressure generating mechanism is formed on the downstream side of the reverse Rayleigh step 15b. The sealing faces of the opposed rotating ring 3 and stationary ring 5 are flat.

When the rotating ring 3 and stationary ring 5 undergo relative movement in the directions indicated by the arrows, fluid that exists between the sealing faces of the rotating ring 3 and stationary ring 5 is about to move following the moving direction of the rotating ring 3 or stationary ring 5 due to its viscosity. Here, a negative pressure (dynamic pressure) as shown by broken lines is generated due to the presence of the reverse Rayleigh step 15b.

Denoted at 15c is a radial groove, 20a and 20b are an inlet portion and an outlet portion of a fluid circulation groove, respectively, and R indicates a land portion.

Although the embodiments of the present invention have been explained with reference to the drawings, specific configurations are never limited to these embodiments, and any modifications and additions shall be included in the present invention unless they depart from the gist of the present invention.

In the above-described embodiments, for example, the description was made about the cases in each of which the sliding component is used as one of a pair of a rotary seal ring and a stationary seal ring in a mechanical seal device. However, the sliding component can be also used as a sliding component of a bearing that is slidable toward one of axial sides of a cylindrical sealing face relative to a rotating shaft while sealing lubricant.

In the above-described embodiments, for example, the description was made about the cases in each of which the high-pressure sealed fluid is present on the outer peripheral side. However, the sliding component can also be applied to a case in which high-pressure fluid is present on the inner peripheral side.

In the above-described embodiments, for example, the description was made about the cases in each of which the spiral grooves 10 and the reverse Rayleigh step mechanisms 15 are adopted as a fluid discharge means. However, the fluid discharge means may comprise dimples without being limited to such cases.

In the above-described cases, for example, the description was made about the cases in each of which the buffer groove 11 is formed continuously in an annular form. However it does not have to be formed continuously and may be formed in an intermittent form. In essence, the buffer groove 11 may be formed in any form insofar as it has a capacity equipped with buffering action.

REFERENCE SIGNS LIST

1 Rotating shaft
2 Sleeve
3 Rotating ring
4 Housing
5 Stationary ring
6 Coiled wave spring
7 Bellows
10 Pumping groove (Spiral groove)
11 Buffer groove
12 Low-pressure fluid
15 Reverse Rayleigh step mechanism
15a Groove
15b Reverse Rayleigh step (Negative pressure generating mechanism)
15c Radial groove
20 Fluid circulation groove
20a Inlet portion
20b Outlet portion
20c Communicating portion
21b Rayleigh step (Positive pressure generating mechanism)
21a Groove
21b Rayleigh step
25 Pressure releasing groove
26 Radial groove
27 Radial groove
S Sealing face
R Land part or portion

The invention claimed is:
1. A pair of sliding components provided, on a high-pressure side of one of relatively sliding sealing faces thereof, with a fluid discharge comprising a plurality of reverse Rayleigh step mechanisms for discharging fluid to a high-pressure fluid side, wherein
each of the reverse Rayleigh step mechanisms includes a groove with a reverse Rayleigh step for generating a negative pressure, and wherein
a buffer groove for reducing penetration of low-pressure fluid toward the high-pressure fluid side is provided in the sealing face on a low-pressure side of the reverse Rayleigh mechanisms.

2. The pair of sliding components according to claim 1, wherein the groove of each of the reverse Rayleigh step mechanisms is a shallow groove isolated from the high-pressure fluid side by a land portion, and wherein each of the reverse Rayleigh step mechanisms further includes a radial groove that is a deep groove communicating with the high-pressure fluid side.

3. The pair of sliding components according to claim 1, wherein the sealing face is provided, on the high-pressure side, with a plurality of fluid circulation grooves in communication with the high-pressure fluid side in addition to the reverse Rayleigh step mechanisms, wherein
each of the reverse Rayleigh step mechanisms is arranged between adjoining two of the fluid circulation grooves on an outside of a space enclosed by each of the fluid circulation grooves and the high-pressure fluid side, and wherein
a plurality of positive pressure generating mechanisms are each provided in a space enclosed by each of the fluid circulation grooves and the high-pressure fluid side.

4. The pair of sliding components according to claim 3, wherein each of the positive pressure generating mechanisms includes a groove with a reverse Rayleigh step, the groove of each of the positive pressure generating mechanisms communicating with an inlet portion of each of the fluid circulation groove and being isolated by a land portion from an outlet portion of each of the fluid circulation grooves and the high-pressure fluid side.

\* \* \* \* \*